United States Patent
Zhou

(10) Patent No.: US 8,818,293 B2
(45) Date of Patent: Aug. 26, 2014

(54) SYSTEM AND METHOD FOR WIRELESS LOCAL AREA NETWORK AIRTIME FAIRNESS

(75) Inventor: Guangquan Zhou, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 257 days.

(21) Appl. No.: 13/412,262

(22) Filed: Mar. 5, 2012

(65) Prior Publication Data

US 2013/0231149 A1 Sep. 5, 2013

(51) Int. Cl.
*H04W 24/00* (2009.01)
*H04B 17/00* (2006.01)

(52) U.S. Cl.
USPC ...... 455/67.13; 455/515; 455/434; 455/452.2

(58) Field of Classification Search
USPC ........... 455/509, 452.1, 452.2, 451, 515, 434, 455/454, 67.11, 67.13
See application file for complete search history.

(56) References Cited

U.S. PATENT DOCUMENTS

| | | | |
|---|---|---|---|
| 2010/0075704 A1* | 3/2010 | McHenry et al. | 455/509 |
| 2011/0128895 A1* | 6/2011 | Sadek et al. | 370/280 |

FOREIGN PATENT DOCUMENTS

| | | | |
|---|---|---|---|
| GB | 2461724 A | | 1/2010 |
| GB | 2461724 A | * | 1/2010 |
| KR | 10-2004-0055554 | | 6/2004 |
| KR | 10-2005-0012269 | | 1/2005 |
| WO | WO 2011/092370 A1 | | 8/2011 |

OTHER PUBLICATIONS

EP Search Report, Jul. 2, 2013.
Joshi et al., Airtime Fairness for IEEE 802.11 Multirate Networks, IEEE Transactions on Mobile Computing, vol. 7, No. 4, Apr. 2008.
Meru WLAN Airtime Fairness explained Pt1, Nov. 16, 2009. (http://www.youtube.com/watch?v=vDmwvA7DJ1I).
Meru WLAN Airtime Fairness explained Pt2, Nov. 16, 2009. (http://www.youtube.com/watch?v=B7m1VHOvTk4).
Bill Kish on Airtime Fairness, Nov. 11, 2010. (http://www.youtube.com/watch?v=JaH_uVtk8nM).
KIPO Office Action, Oct. 10, 2013.

* cited by examiner

*Primary Examiner* — John J Lee
(74) *Attorney, Agent, or Firm* — Duane S. Kobayashi

(57) ABSTRACT

A system and method for wireless local area network airtime fairness. Distribution of airtime amongst a plurality of associated mobile stations can be based on a determination of a total channel availability. The total channel available is based on a total channel utilization determined through detected energy on the channel and a mobile station utilization determined through monitored traffic between the wireless access point and the associated mobile stations.

20 Claims, 3 Drawing Sheets

SYSTEM AND METHOD FOR WIRELESS LOCAL AREA NETWORK AIRTIME FAIRNESS

BACKGROUND

1. Field of the Invention

The present invention relates generally to wireless local area networks, and more particularly, to a system and method for wireless local area network airtime fairness.

2. Introduction

Wireless devices such as smart phones and tablet computing devices continue to proliferate, adding to the total number of mobile devices that seek pervasive Wi-Fi connectivity. The rapid introduction of advancing apps and Internet use on these mobile devices adds to the challenge of network support in an enterprise environment. In particular, enterprises are faced with significant challenges in identifying best practices in their build out of their wireless local area network (LAN) environment.

Wireless LAN technology continues to evolve as wireless connection speeds advance. Wireless networks must therefore be configured to support multiple device types, including legacy 802.11 a/b/g devices, current 802.11n devices that enable greater than 100 Mbit/s speeds, and future 802.11AC devices that enable greater than 1 Gbit/s speeds. The upper limit of such wireless LAN connections will continue to advance, therefore placing an increased burden on wireless LAN networks in providing sufficient support over a defined geography and a mix of wireless devices.

Enterprises need to develop an appropriate strategy for building and maintaining their wireless LAN environment. As more wireless-only devices hit the market and more individuals bring these devices into the enterprise environment, the premium on such planning will only increase. Without a suitable wireless LAN strategy, an enterprise's existing network deployment will be overwhelmed to the point of producing unsatisfactory network performance.

The trend in this area indicates that Wi-Fi technologies will be increasingly relied upon as cellular networks become overburdened. As it stands today, cellular network operators are placing ever-increasing premiums on the data rates charged to the mobile devices.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
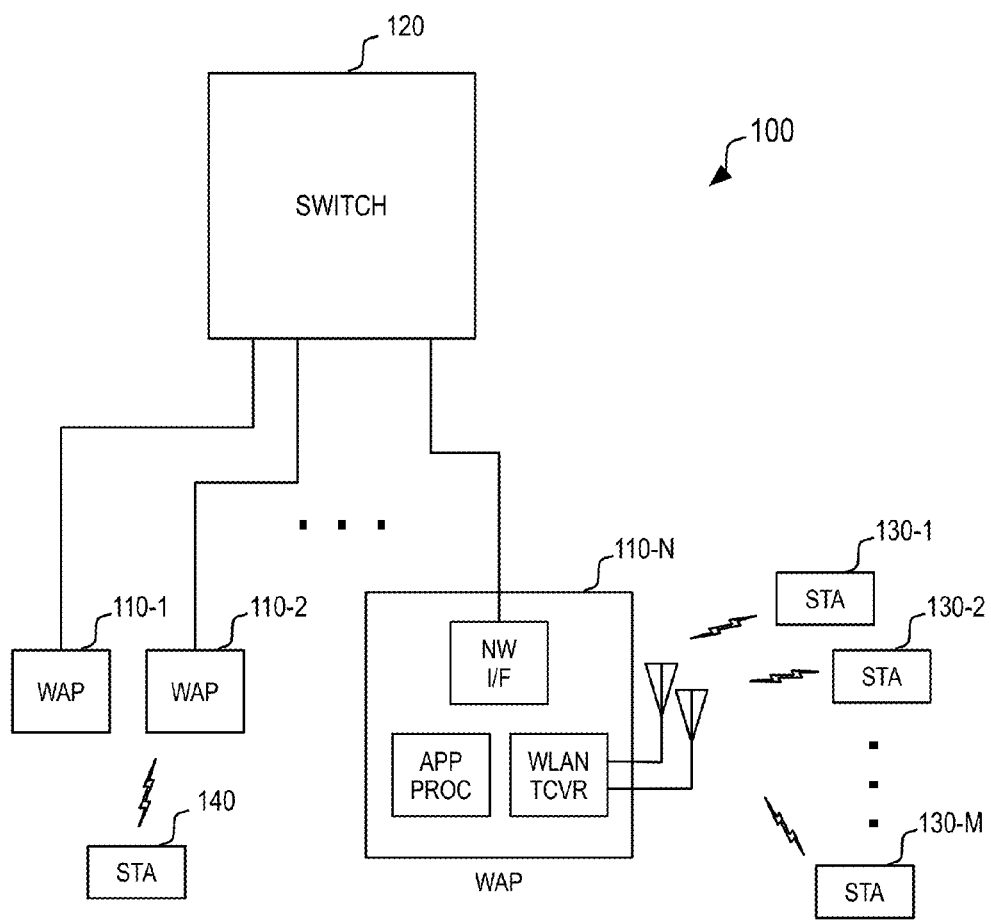
FIG. 1 illustrates an example embodiment of a wireless local area network.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Network connection speeds of wireless devices are advancing rapidly as the wireless industry seeks to satisfy an increasing appetite for multimedia content. What is true today is that the bandwidth needs of an average user have increased at a rapid rate in connection with the advancing applications being used and the increased connectivity afforded by the expanding footprint of Wi-Fi networks as a whole. Today's users have therefore developed an increased expectation in the level of support provided by wireless LAN networks.

In the enterprise, wireless LAN networks face the challenge of supporting a various range of devices, from legacy wireless devices to next-generation wireless devices that enable greater than Gbit/s speeds. One of the challenges faced by the enterprise is the ability to fairly support these mix of devices.

In that regard, fairness is a key attribute in providing proper support for wireless devices. To illustrate the concept of fairness, consider a wireless access point that supports a mix of mobile stations. In one simple example scenario, a first mobile station that is associated with the wireless access point may connect at 300 Mbit/s, while a second mobile station that is associated with the wireless access point may connect at 1 Mbit/s. In this scenario, the first mobile station can transmit or receive 300 times the amount of data in the same amount of time as compared to the second mobile station. Alternatively, one could view the disparity as the first mobile station taking $\frac{1}{300}$ the amount of time to transmit the same amount of data as compared the second mobile station.

As would be appreciated, this disparity in data transmission rates can be due to the type of device as well as the distance from the mobile station to the wireless access point. Regardless, when supporting a mix of devices, the common scenario of supporting lower-speed legacy devices can create disproportionate usage scenarios with respect to mobile station connectivity from a time and/or data perspective. This is increasingly true when considering the support of next-generation 802.11AC devices that are designed for Gbit/s transmission rates.

Arbitration of fairness between mobile stations associated with a wireless access point is a key mechanism of ensuring acceptable performance by a wireless access point. A failure to properly arbitrate such fairness can lead to wireless LAN deployment scenarios that overcompensate for such "unfairness" by building a greater than needed capacity in the wireless LAN infrastructure.

It is therefore a feature of the present invention that wireless LAN airtime fairness can be enabled through an accurate estimation of available airtime that can be distributed to mobile stations associated with a wireless access point. As will be described in greater detail below, this mechanism of estimating available airtime can be used with various types of distribution mechanisms that assign airtime to mobile stations in a "fair" manner.

To illustrate the features of the present invention, reference is first made to the example wireless LAN network environment illustrated in FIG. 1. As illustrated, wireless LAN network environment 100 includes a plurality of wireless access points (WAPs) 110-n that can be arranged in an enterprise to provide ubiquitous wireless coverage across a designated physical space. The wireless access points 110-n can each be coupled to a switch 120 via a network interface. Switch 120 provides further connectivity of the wireless access points 110-n to an enterprise network (not shown).

As illustrated by the example of wireless access point 110-N, a wireless access point can include an application processor (APP PROC) in addition to a wireless LAN transceiver (WLAN TCVR) that is coupled to one or more antennas. WLAN TCVR enables wireless communication in accordance with one or more wireless standards (e.g., 802.11 a/b/g, 802.11n, 802.11AC, etc.) in supporting a plurality of associated mobile stations (STAs). In the illustrated example of FIG. 1, mobile stations 130-m are associated with wireless access point 110-N, while mobile station 140 is associated with mobile station 110-2.

Communication between a mobile station and a wireless access point is based on a carrier sense mechanism. This carrier sense mechanism can be represented by a clear channel assessment (CCA), which is a determination of whether another communication between the wireless access point and another mobile station is currently occurring. As part of this process, the CCA can detect and decode an incoming Wi-Fi signal preamble, whereupon the CCA can indicate a busy medium. If a mobile station detects a busy medium, then the mobile station can wait for a defined backoff period before performing a reassessment of the CCA.

In accordance with the present invention, an energy detection is performed on a channel to determine the channel utilization that is attributable to all sources of traffic. Here, it is recognized that the following three types of traffic can exist on an open-air channel: Type 1 traffic, which includes unicast traffic between the wireless access point and mobile stations associated with that wireless access point; Type 2 traffic, which includes traffic to/from others wireless access points on the same open-air channel; and Type 3 traffic, which includes public traffic such as broadcast/multicast traffic, wireless distribution service (WDS) link and management frames such as beacons, or energy generated by other devices that is detectable on the open-air channel.

Figure 2:
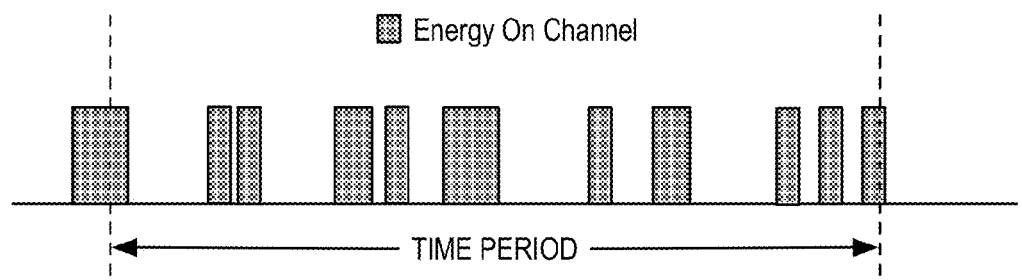
FIG. 2 illustrates a energy on a channel due to all sources.

FIG. 2 illustrates an example of the energy on a channel that can be attributed to Type 1, Type 2 and Type 3 traffic. As illustrated, the energy detected on the channel that is generated by the Type 1, Type 2 and Type 3 traffic can be measured in a defined time period (e.g., 5-10 seconds). Here, the fraction of a time period that energy attributable to Type 1, Type 2 and Type 3 traffic can be detected on the channel can represent the CCA channel utilization.

In one embodiment, the CCA channel utilization can be measured by the wireless access point using suitable logic, circuitry, and/or code that enables a measurement of the detectable energy on the channel over a defined time period. For example, the wireless access point can use suitable logic, circuitry, and/or code in the application processor and/or wireless transceiver of the wireless access point to determine an amount of time that energy is detected on the channel using one or more timers. As part of this process, the wireless access point would continuously measure whether energy above a threshold level is detected on the channel to thereby determine the time during the time period that can be attributed to a busy state or an available state. In one embodiment, the CCA channel utilization result is represented simply by the percentage of time that the channel is in a busy state.

As noted above, the measurement of the CCA channel utilization can be designed to measure the activity on the channel that is attributable to Type 1, Type 2 and Type 3 traffic. To determine the actual amount of free time that can be distributed to associated mobile stations, the amount of time attributable to Type 1 traffic is determined.

Figure 3:
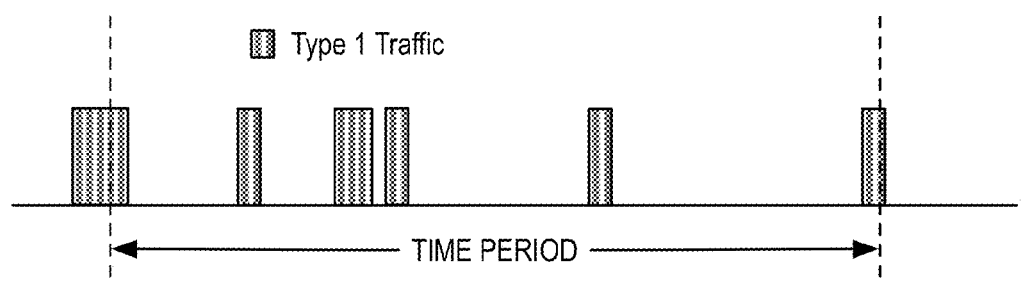
FIG. 3 illustrates communication on a channel between a wireless access point and registered mobile stations.

FIG. 3 illustrates the amount of Type 1 traffic that exists on the channel. As illustrated, the Type 1 traffic on the channel represents a subset of the total detectable energy on the channel due to Type 1, Type 2, and Type 3 traffic as illustrated in FIG. 2. The difference between the illustrations in FIG. 2 and FIG. 3 is therefore attributable to the detectable energy that is produced by Type 2 and Type 3 traffic.

In one embodiment, the amount of Type 1 traffic that exists on the channel can be determined by the wireless access point by measuring the amount of traffic communicated between the wireless access point and all of the associated mobile stations. In one example, the measurement of the amount of traffic communicated between the wireless access point and all of the associated mobile stations can be performed using one or more counters that measure the packet durations for those communications. As would be appreciated, the particular mechanism for measuring the communication would be implementation dependent. Of significance is a determination by an implementation-dependent mechanism of a measure of the amount of airtime attributable to the Type 1 communications relative to the total time available. In one example, this measure can be expressed as a percentage of the total time available.

In the present invention, the measure of the CCA channel utilization as illustrated in FIG. 2 along with the measure of the Type 1 mobile station utilization as illustrated in FIG. 3 can be used to determined the actual channel availability. This determination is illustrated graphically in FIG. 4.

Figure 4:
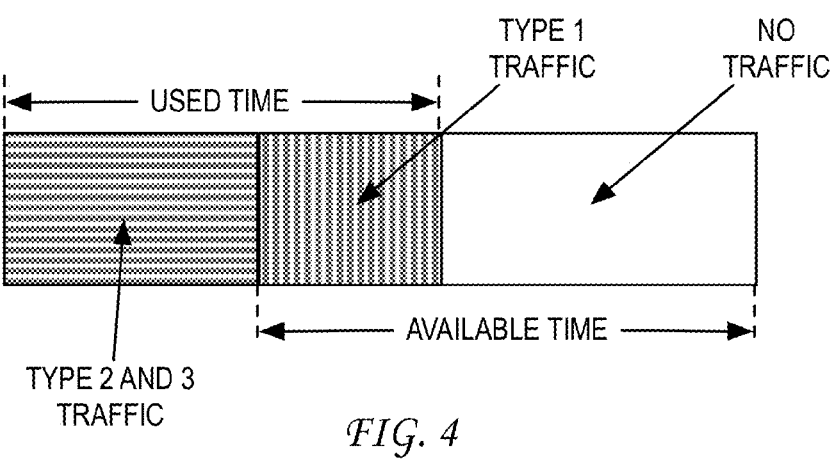
FIG. 4 illustrates an embodiment of a determined free time on a channel.

As illustrated, the total used time represents the total detected energy on the channel as illustrated in FIG. 2. In the illustration of FIG. 4, this total detected energy is broken into two parts: a first part represented by Type 2 and Type 3 traffic, and a second part represented by Type 1 traffic (see FIG. 3). The total detected energy is broken into these two parts because the actual pool of available time that will be distributed to the associated mobile stations includes both the time when no energy was detected on the channel and the time attributable to Type 1 traffic. The combination of these two parts is illustrated in FIG. 4 as the available time.

As noted above, the wireless access point can be designed to measure the CCA channel utilization and the Type 1 mobile station utilization. In determining the available time as illustrated in FIG. 4, the following equation can be used:

$$\text{Channel Availability}=1-(\text{CCA channel utilization})+(\text{Type 1 mobile station utilization})$$

To illustrate this calculation, consider an example where the wireless access point determines that the detected energy on the channel is 70%. In other words, only 30% of the time is considered time when no detectable energy exists on the channel. Assume further that the wireless access point determines that the Type 1 traffic on the channel is measured to be 30%. Based on the above equation, the channel availability would be determined as 1−0.70+0.30=0.60.

As this example illustrates, 60% of the channel would be available for the associated mobile stations. This determined amount of time would then represent the pool of available time that can be distributed amongst the associated mobile stations. For example, in one embodiment, 600 ms of every second can be distributed amongst the associated mobile stations. Thus, if the wireless access point has six associated mobile stations that it supports, then the wireless access point can assign a less than 100 ms counter for each of the associated mobile stations. In this example, less than 100 ms of airtime is distributed to each mobile station such that some airtime is left in the pool of available time. This leftover time can be used to accommodate new mobile stations that associate with the wireless access point. This would enable the wireless access point to maintain the existing distribution of time amongst the original six mobile stations.

In one embodiment, the counters that are assigned to the associated mobile stations can be used to govern the traffic that is permitted to flow to/from the associated mobile stations. For example, all measured traffic that is communicated between the wireless access point and a particular mobile station can be counted and the counted airtime can lead to a deduction of the counter value. In one embodiment, exceeding the amount of time attributable to a particular mobile station would lead to the wireless access point dropping a received packet. This would lead to the mobile station being delayed in receiving a TCP_ACK messaging, which would effectively slow down traffic to/from the mobile station.

It is a feature of the present invention that the determination of the pool of available time based on the mechanism described above can be used in combination with various distribution schemes in implementing some measure of fairness. The determination of the actual pool of available time provides fairness mechanisms with an accurate starting point in implementing their fairness distribution scheme. As such, various fairness algorithms that are designed to implement counters, tokens, etc. can be used in implementing equal or unequal sharing of the pool of available time as desired.

Figure 5:
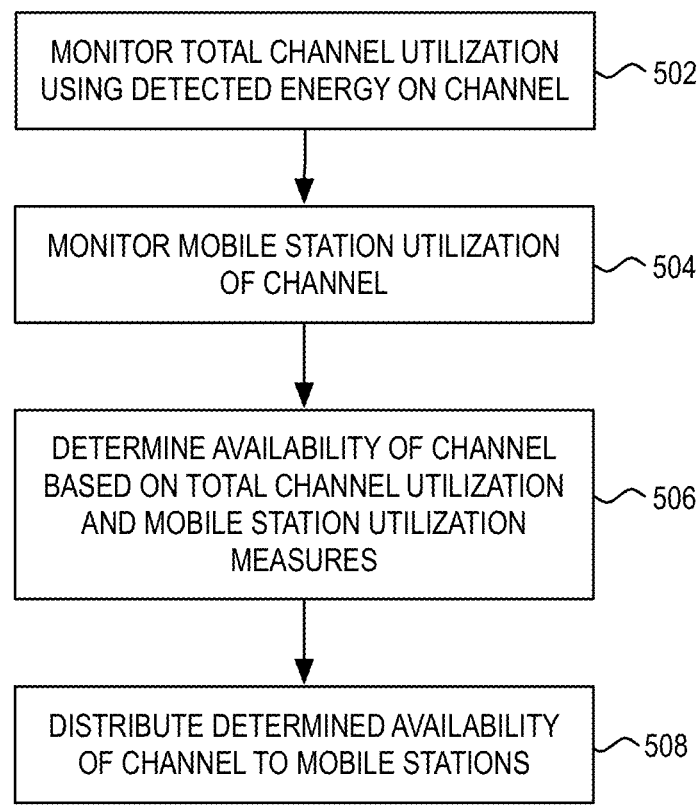
FIG. 5 illustrates a flowchart of a process of the present invention.

To further illustrate the features of the invention, reference is now made to the flowchart of FIG. 5, which illustrates a process of the present invention. As illustrated, the process begins at step 502 where the wireless access point monitors the total channel utilization using detected energy on the channel. Here, it should be noted that the monitoring of the total channel utilization can be performed periodically based on a configurable parameter. For example, the configurable parameter can dictate that the measurement of the total channel utilization be performed every 5-10 seconds. As would be appreciated, the particular frequency of such a measurement would be implementation dependent in providing sufficient granularity to effect the desired fairness control.

Next, at step 504, the wireless access point monitors the mobile station utilization of the channel. As with the monitoring of the total channel utilization, this monitoring of Type 1 traffic can be performed periodically based on a configurable parameter. Here, it should be noted that the periodicity of monitoring of the total channel utilization need not be coincident with the periodicity of monitoring of the mobile station utilization of the channel. As would be appreciated, the periodicity would be dependent on the granularity of fairness control in generating a sufficient estimate of the pool of available time, which is to be distributed amongst the associated mobile stations.

After a measure of the total channel utilization and the mobile station utilization is generated at steps 502 and 504, the availability of the channel can then be determined at step 506. In one embodiment, the availability of the channel can be determined using the equation listed above.

After the availability of the channel is determined, the distribution of the determined pool of available time can then be performed at step 508. As noted above, the particular mechanism by which a pool of available time is distributed amongst associated mobile stations would be implementation dependent. In one embodiment, the control of the distribution of the pool of available time is performed by the wireless access point. This embodiment represents the simplest implementation with respect to the fairness mechanism. In one embodiment, the wireless access point would determine how to distribute the pool of available time, then govern the distribution using one or more airtime counters.

In another embodiment, the control of the distribution of the pool can be effected at least in part by a switch or other network device (referred to generically as a network controller) that is in communication with a plurality of wireless access points. In this embodiment, the network controller can be designed to analyze the relative sizes of the pools of available time for the plurality of wireless access points and determine whether to effect load balancing between the wireless access points. For example, the network controller can be designed to direct one or more mobile stations to associate with particular wireless access points that have a large pool of available time.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    first monitoring, by a wireless access point, a first utilization measure of a channel, said first monitoring including an identification of a portion of time during a first time period that said first monitoring detects energy on said channel;
    second monitoring, by said wireless access point, during a second time period, a second utilization measure of said channel by a plurality of mobile stations associated with said wireless access point, said second monitoring including an identification of a portion of time during a second time period that said second monitoring detects data traffic being sent by said wireless access point to said plurality of mobile stations or received by said wireless access point from said mobile stations;

determining an availability of said channel based on said first utilization measure and said second utilization measure; and distributing said determined availability of said channel amongst said plurality of mobile stations, wherein said distributing comprises assigning, by said wireless access point, a separate counter to each of said plurality of mobile stations, said counters being used to monitor a level of use of said channel by each of plurality of mobile stations.

2. The method of claim 1, wherein said determining comprises calculating $1 - U1 + U2$, where U1 is the first utilization measure and U2 is the second utilization measure.

3. The method of claim 1, wherein said first monitoring considers utilization of said channel by a second wireless access point to which said mobile stations are not associated.

4. The method of claim 1, wherein said first monitoring considers utilization of said channel by other devices that are incompatible with said wireless access point.

5. The method of claim 1, further comprising dropping a packet received from a first of said plurality of mobile stations when it is determined that a counter associated with said first of said plurality of mobile stations has exceeded a threshold level.

6. The method of claim 1, wherein said determining is performed periodically.

7. The method of claim 1, wherein said determining comprises lowering a total availability value by a first amount indicated by the first utilization measure to produce a first result, and adding a second amount indicated by the second utilization measure to the first result.

8. A method, comprising:

determining an availability of a channel based on a channel energy detection measure and a mobile station utilization measure, said channel energy detection measure representing a first percentage of time during a first time period that energy is detected on said channel, and said mobile station utilization measure representing a second percentage of time during a second time period that communication is detected between a wireless access point and a plurality of mobile stations; and distributing said determined availability of said channel amongst said plurality of mobile stations, wherein said distributing comprises assigning, by said wireless access point, a separate counter to each of said plurality of mobile station , said counters being use to monitor a level of use of said channel by each of said plurality of mobile stations.

9. The method of claim 8, wherein said determining comprises calculating $1 - U1 + U2$, where U1 is the channel energy detection measure and U2 is the mobile station utilization measure.

10. The method of claim 8, wherein said channel energy detection measure considers utilization of said channel by a second wireless access point to which said mobile stations are not associated.

11. The method of claim 8, wherein said channel energy detection measure considers utilization of said channel by other devices that are incompatible with said wireless access point.

12. The method of claim 8, further comprising dropping a packet received from a first of said plurality of mobile stations when it is determined that a counter associated with said first of said plurality of mobile stations has exceeded a threshold level.

13. The method of claim 8, wherein said determining is performed periodically.

14. The method of claim 8, wherein said determining comprises lowering a total availability value by a first amount indicated by the first utilization measure to produce a first result, and adding a second amount indicated by the second utilization measure to the first result.

15. A wireless access point, comprising:

a wireless transceiver that enables communication with a plurality of mobile stations via a communication channel; and a controller that distributes available airtime amongst said plurality of mobile stations, said available airtime being determined based on a channel energy detection measure and a mobile station utilization measure, said channel energy detection measure representing a first percentage of time during a first time period that energy is detected on said communication channel, and said mobile station utilization measure representing a second percentage of time during a second time period that communication is detected between said wireless access point and said plurality of mobile stations, wherein said wireless access point drop a packet receive from a first of said plurality of mobile station when it is determined that a counter associated with said first of said plurality of mobile stations has exceeded a threshold level.

16. The wireless access point of claim 15, wherein said available airtime is determined by calculating $1 - U1 + U2$, where U1 is the channel energy detection measure and U2 is the mobile station utilization measure.

17. The wireless access point of claim 15, wherein said channel energy detection measure considers utilization of said channel by a second wireless access point to which said mobile stations are not associated.

18. The wireless access point of claim 15, wherein said channel energy detection measure considers utilization of said channel by other devices that are incompatible with said wireless access point.

19. The wireless access point of claim 15, wherein said distribution assigns a separate counter to each of said plurality of mobile stations, said counters being used to monitor a level of use of said communication channel by each of said plurality of mobile stations. result, and adding a second amount indicated by the second utilization measure to the first result.

20. The wireless access point of claim 15, wherein said available airtime is determined by lowering a total available airtime value by a first amount indicated by the first utilization measure to produce a first result, and adding a second amount indicated by the second utilization measure to the first result.

* * * * *

UNITED STATES PATENT AND TRADEMARK OFFICE
CERTIFICATE OF CORRECTION

PATENT NO.        : 8,818,293 B2                                          Page 1 of 1
APPLICATION NO.   : 13/412262
DATED             : August 26, 2014
INVENTOR(S)       : Guangquan Zhou It is certified that error appears in the above-identified patent and that said Letters Patent is hereby corrected as shown below:

In the Claims

Col. 7, line 49, replace "station" with --stations--.

Col. 7, line 49, replace "use" with --used--.

Col. 8, line 32, replace "station" with --stations--.

Col. 8, lines 51-52, delete "result, and adding a second amount indicated by the second utilization measure to the first result.".

Signed and Sealed this
Twenty-first Day of October, 2014

Michelle K. Lee
*Deputy Director of the United States Patent and Trademark Office*